July 31, 1956 W. T. ROSSELL 2,756,692
TRUCK BOLSTER AND SNUBBERS THEREFOR
Filed May 28, 1951 3 Sheets-Sheet 1
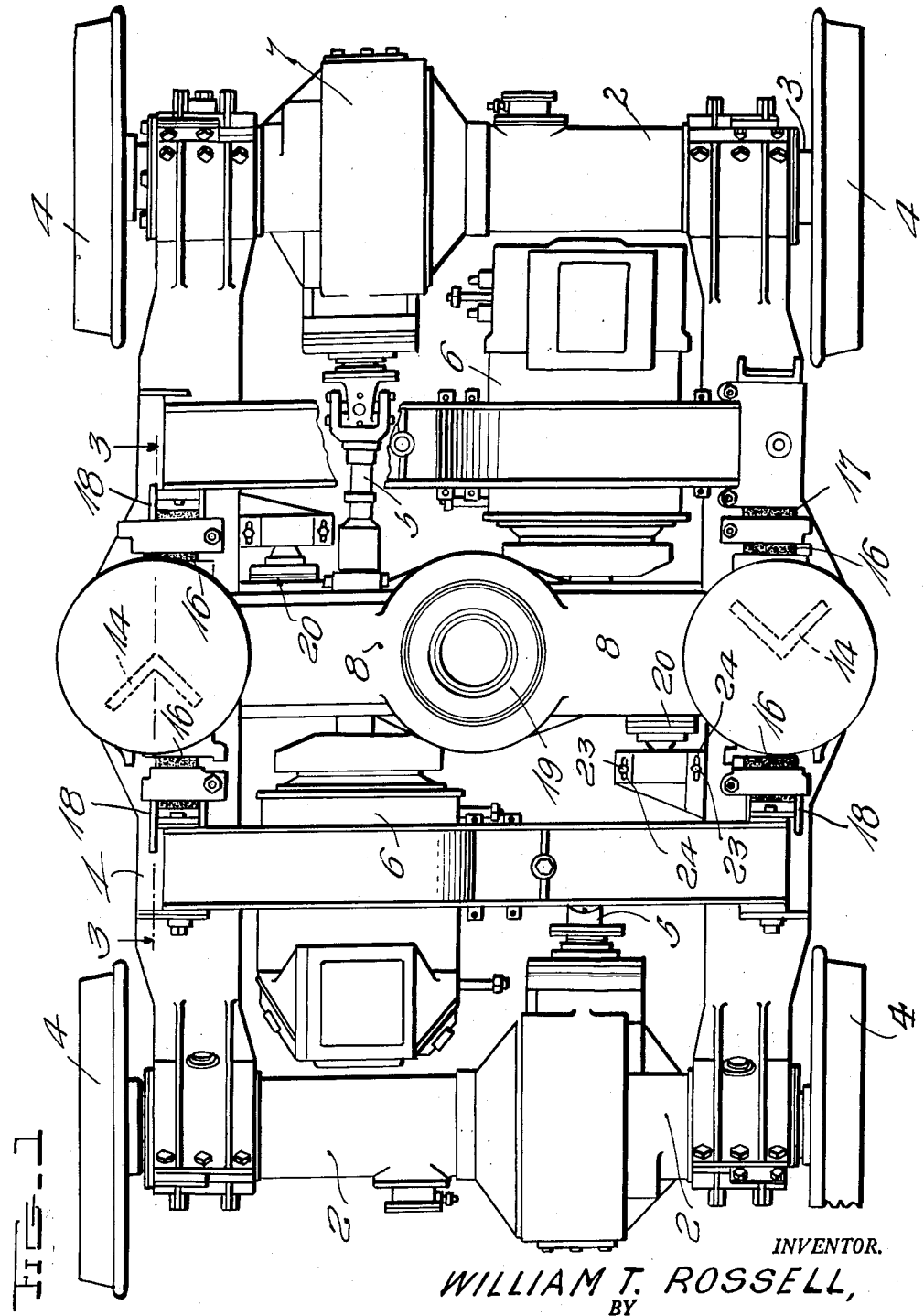
INVENTOR.
WILLIAM T. ROSSELL,
BY
Windsor Davis
ATTORNEY

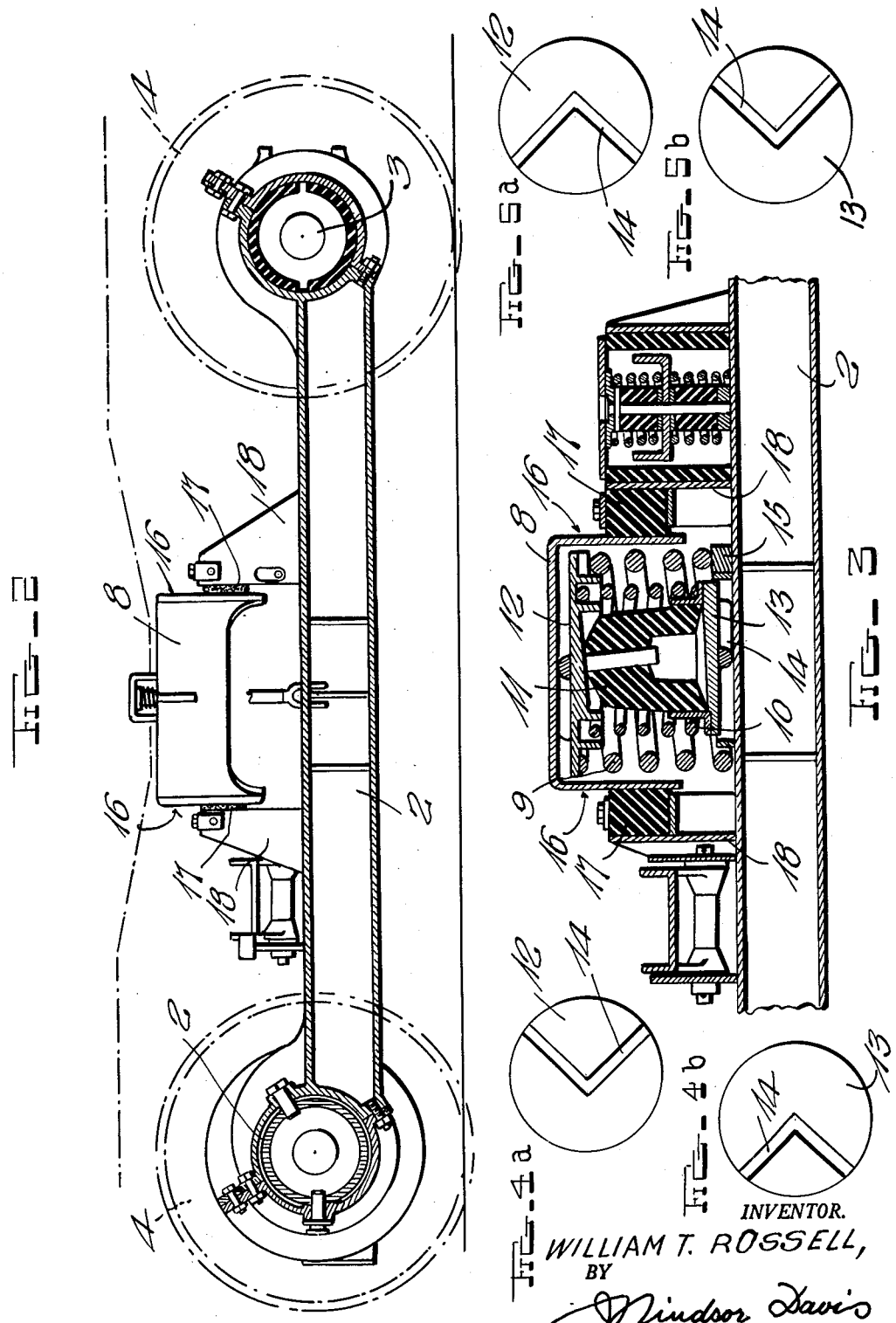

July 31, 1956  W. T. ROSSELL  2,756,692
TRUCK BOLSTER AND SNUBBERS THEREFOR
Filed May 28, 1951  3 Sheets-Sheet 3
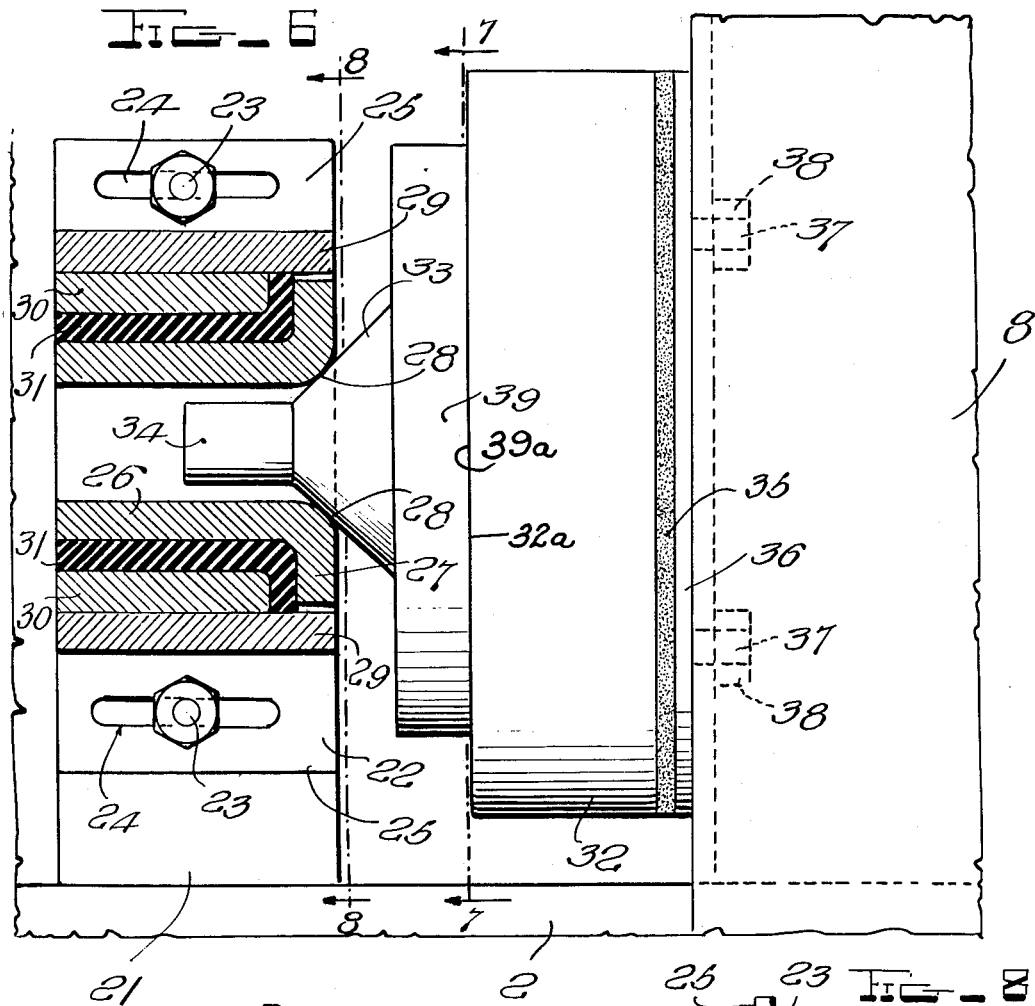
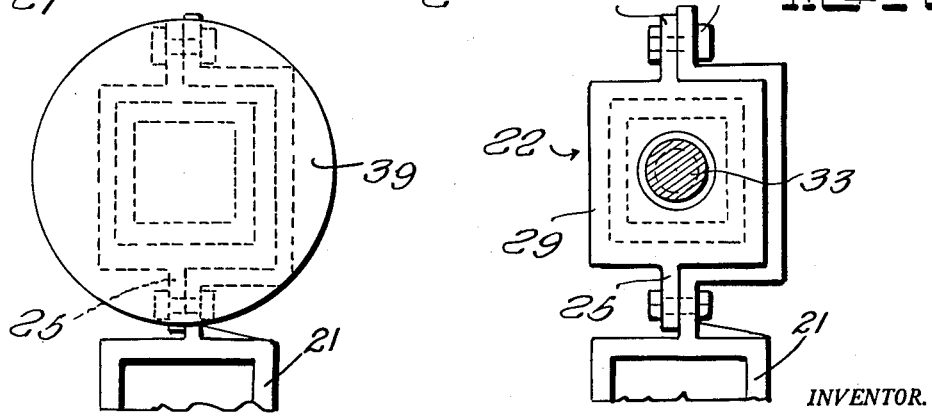
INVENTOR.
WILLIAM T. ROSSELL,
BY
Windsor Davis
ATTORNEY United States Patent Office 2,756,692
Patented July 31, 1956

2,756,692

TRUCK BOLSTER AND SNUBBERS THEREFOR

William T. Rossell, New York, N. Y., assignor to Transit Research Corporation, New York, N. Y., a corporation of New York Application May 28, 1951, Serial No. 228,709

15 Claims. (Cl. 105—193)

This invention relates to rail trucks of the type in which a truck bolster is supported from the truck frame by means of springs, and has for its principal object to provide improved means for controlling the swing motions of the bolster in order to improve the riding quality of the truck.

In my co-pending application, Serial Number 191,674 filed October 23, 1950, I illustrate and describe a rail truck of the type mentioned above. In that application friction elements located on each side of each end of the bolster act as transom means and the spring supports are so formed as to cause the bolster to rub against an element at each end of the bolster with a pressure which is zero when the bolster is at or near its central position and which increases with increasing swinging movement of the bolster. It has been found that, for certain kinds of service, it is desirable that some friction oppose all movements of the bolster. It has also been found that it is desirable in certain kinds of service to increase the friction which is obtainable with friction elements made from conventionally used friction materials over and above the amount which results from the arrangement described in said co-pending application.

A principal object of this invention therefore is to provide an improved snubber assembly usable in addition to the friction elements described in said co-pending application thereby to obtain additional motion damping as may be required to obtain better riding quality.

More specifically, an object of the invention is to provide an improved snubber assembly incorporating friction elements supported in such manner as to give maximum surface contact therebetween, at all times, and insulated from the main truck frame to the extent of damping short wave vibrations which would otherwise be transmitted from the truck frame to the car body thereabove.

Another object is to provide bolster supporting means in the form of improved bolster spring caps which will cause the bolster to lie against the improved snubber assembly when the bolster is at rest thereby introducing frictional resistance against all movements of the bolster. These improved spring caps retain the ability to cause increased friction in response to increased swinging movement of the bolster.

Another object is to provide a snubber assembly of improved type which can employ ordinary metallic friction elements having long life and which are so arranged as to be readily replaceable as may be necessary.

Another object is to provide an improved bolster support in combination with an improved snubber assembly, as above described, which will automatically compensate for wear of the friction surfaces to a substantial degree, and, further, to provide means by which wear may be compensated manually. In this manner the truck will have constant riding quality for a substantial period of time, automatically, and may be adjusted manually at substantial intervals of time to assure continuation of the same riding quality.

Other objects and advantages will become hereinafter more fully apparent as reference is had to the accompanying drawings which illustrate my invention and in which Figure 1 is a plan view of a rail truck embodying my invention, Figure 2 is a side elevation of the truck shown in Figure 1, Figure 3 is a vertical section taken through one end of the bolster showing a portion of a side frame, taken along the line 3—3 of Figure 1, Figures 4a and 4b are plan views of the exterior surfaces of the upper and lower spring caps, respectively, at one end of the bolster showing the relative positions of the rockers, Figures 5a and 5b are views similar to Figures 4a and 4b showing the relative positions of the upper and lower rockers, respectively, at the other end of the bolster, Figure 6 is an enlarged view of one snubber assembly with one friction element holder shown in horizontal section and also showing the mounting of the snubber assembly on the truck frame and bolster, Figure 7 is a plan view of one friction element taken along the line 7—7 of Figure 6, Figure 8 is an end view of a friction element holder taken along the line 8—8 of Figure 5 with the friction element removed.

More particularly, 1 indicates the side frames of a truck connected to axle housings 2 which house axles 3 upon the outer ends of which the wheels 4 are mounted. The axles are driven by propeller shafts 5 which are driven by the main motors 6, the shafts 5 being connected to the axles by gearing (not shown) contained in the gear housings 7 which form a part of the axle housings 2. The truck, as thus far described, is a powered truck but it need not be powered as the invention is applicable to numerous types of trucks.

A bolster 8 is supported from the side frames 2 by means of spring assemblies. These supporting assemblies may be of any conventional or special type but are herewith illustrated as being composed of two concentric coil springs 9 and 10 encompassing a rubber spring 11, as shown in Figure 3. A spring cap 12 common to the upper ends of all three springs is provided. A lower spring cap 13 common to the rubber spring 11 and the inside coil 10 is also provided, the lower end of the coil 9 resting directly upon the frame 2.

The spring caps 12 and 13 are each provided with two angularly disposed half rockers 14 and the caps are thickened in the region of the rockers so that the springs 10 and 11 have a position of rest slightly out of vertical. The spring 9 may also be given a slight initial tilt by interposing a filler 15. The direction and effect of the tilting of the springs is controlled by the positioning of the spring caps as will be described hereinafter.

The ends of the bolster 8 are, generally, of rounded form, in plan view, having flattened side walls 16 adapted for rubbing contact with friction blocks 17 which may suitably be composed of rubber. These blocks 17 are each held in firm position with respect to the frames 2 by brackets 18 which are of sturdy construction capable of transmitting driving and retarding forces between the bolster 8 and the side frames 2. As the bolster engages in lateral swinging movements the surfaces 16 have frictional engagement with the elements 17 thus acting to damp the swinging movements. This friction is increased by imparting to the bolster supporting springs 9, 10 and 11 a slight inclination in a direction longitudinally of the side frames 2. The inclination may be in one direction at one end of the bolster and in opposite direction at the other end, which is preferred, or the inclination may be the same at both ends. A principal advantage of the inclination of the springs is to provide some frictional resistance to movement of the bolster immediately upon movement from its centered position.

Between the ends of the bolster and its mid-portion, where a body centerpin bearing 19 is located, at diagonally opposite sides of the bolster I locate additional snubbing assemblies generally designated by the numeral 20. The assemblies are shown in Figure 1 and are best illustrated in Figure 6.

These assemblies are each composed, first, of a bracket 21 fixedly secured to a side frame 2. A friction element holder or carrier 22 is held on the bracket 21 by spaced bolts 23 which extend through a hole in the bracket and through a slot 24 in the wings 25 formed on the element holder thus permitting adjustment of the position of the holder with respect to the bracket.

The holders or carriers 22 are each composed of a cylindrical center portion 26 flared outwardly at one end 27 with the juncture of the flare and the cylindrical portion forming a seat 28 for a friction element 39. The periphery of the flared end is square and fits in an open box 29 which carries the wings 25 and which has a spacer 30 interiorly thereof. Between the spacer 30 and the member 26, 27, I place a non-metallic liner 31 capable of absorbing many short wave vibrations which would otherwise be transmitted from the frames 2 to the bolster 8. The material of the liner 31 may be suitably composed of rather stiff rubber or of layers of rubber impregnated fabric.

The friction element 39 may be composed of ordinary friction material, such as cast iron. It is cylindrical in shape, having one flat friction face 39a for contact with the surface 32a of a second friction element 32. From its other face arises a seat 33 of frusto-conical shape having a cylindrical stem 34 forming an extension of its small base. The seat 33 finds a ring contact with the seat 28 of the element holder 22. The actual ring of contact between the seats 28 and 33 may change to accommodate shifting positions of the element 39. In other words, the seat 33 is capable of universal movement with respect to the seat 28.

The element 32 is cylindrical or elliptical in form with a somewhat larger contact area 32a than that of the element 39. Thus, upon relative movement of the elements they will always have full contact. The element 32 may be composed of metal also but it should be harder than that of the element 39, or vice versa. The rear face of this element is, preferably, surface bonded to a thin non-metallic liner 35 which is, in turn, surface bonded to a metallic piece 36. The piece 36 has integral bolts 37 which extend through holes in the bolster 8. Nuts 38 on the bolts fix the element 32 on the bolster 8.

The operation will now be described. The bolster 8 is supported by springs 8, 9 and 10 which are given an initial tilt so that the elements 32 and 39 of the two snubber assemblies will be in pressure contact and will therefore frictionally oppose all swinging movements of the bolster. As the bolster swings it will cause tilting of the springs 8, 9, 10 laterally of the frames 2 and consequent tilting of the spring seats 12 and 13. The spring seats will each rock on one half-rocker while elevating the other half-rocker out of contact with its support. The rockers 14 of the lower caps 13 are diametrically oppositely placed with respect to each other, as is illustrated in Figures 4b and 5b. The rockers 14 of the upper spring caps 12 are diametrically oppositely placed with respect to each other, as shown in Figures 4a and 5a, and they are also diametrically oppositely placed with respect to the rockers 14 of the caps 13. Thus as the bolster swings outwardly in one direction causing the lower spring caps 13 to rock on one half-rocker 14, the upper spring caps will also tilt and rock on their half-rocker 14 which is parallel to the working rocker of the other spring cap. The result will be that one end of the bolster is urged in a direction to increase the pressure between the friction elements 32 and 39 while the other end of the bolster will increase the pressure between its friction elements 32 and 39.

It will be seen from the foregoing that, if the direction of initial tilt of the springs 8, 9 and 10 is toward the snubber assemblies, the bolster will lie on a bias with respect to its direction of swing when it is at rest, and that tilting of the spring nests, which is caused by action of the rockers, will add its pressure to that caused by the initial tilt.

It will be further evident that if the initial tilt imparted to the spring nests is in the same direction at both ends of the bolster, the friction caused thereby will be increased during acceleration of the truck and decreased during deceleration, or vice versa, whereas if the initial tilt is in the direction of the snubber assemblies, acceleration will increase the pressure on one snubber assembly and on one rubber block 17, while decreasing it on the other snubber assembly. The gain on one side is thus balanced by the loss at the other side during acceleration and deceleration of the truck. A recognition of these factors will enable a designer to elect the combination best suited to the service for which a specific truck is to be adapted.

The rockers 14 have been described as two half-rockers in the intersts of clarity. In actual construction, the intervening small space between the rockers may be filled in solidly with metal as the rocking is done only on the edges. This intervening metal may be flat across the top thus paralleling the main exterior surface of the caps or it may be somewhat rounded to give an easier rocking action. Such small matters in choice of design may be supplied by the truck builder and I therefore desire to be extended protection as defined by the appended claims.

What I claim is:

1. A snubber assembly comprising two relatively movable friction elements, one of said elements being fixedly mounted, and a carrier for the other of said elements, said carrier supporting its element for surface contact with the fixedly mounted element, the element carried by said carrier having universal movement with respect thereto whereby said friction elements may always find full surface engagement during rubbing contact.

2. A snubber assembly comprising two relatively movable friction elements, one of said elements being fixedly mounted, a bracket supporting a carrier of one of said elements, said carrier supporting its element for surface contact with the fixedly mounted element, the element being mounted for universal movement with respect to said carrier, said carrier being manually adjustable on said bracket to adjust the distance relation between said elements.

3. A snubber assembly comprising two relatively movable friction elements, a carrier for one of said elements, said carrier comprising one part which provides a seat for universal movement of its element, insulating means of rubber-like material supporting said one part on a base, and means fixedly mounting the other of said elements on a member movable with respect to said base in a direction such that said elements have rubbing surface contact with each other.

4. A snubber assembly comprising two relatively movable friction elements, a bracket supporting a carrier for one of said elements, said carrier comprising one part having a seat for supporting its element for universal movement with respect to the other element, and insulating means of non-metallic material supporting said part on a carrier base, said carrier base being manually adjustable with respect to said bracket in a direction to vary the distance relation between said elements.

5. In a rail truck, a truck frame, a bolster mounted for lateral swinging movements with respect to said frame and being capable of swinging movements in a variable lateral path, friction elements carried by said bolster in spaced relation on opposite sides of the center thereof, other friction elements carried by said frame against which the friction elements carried by said bolster are adapted to have rubbing contact, said other friction elements being mounted for universal movement with respect to said frame whereby said elements in rubbing contact find full surface engagement.

6. In a rail truck, a truck frame, a bolster mounted for lateral swinging movements with respect to said frame, friction elements carried by said bolster in spaced relation on opposite sides of the center thereof, other friction elements carried by a carrier mounted on said frame, said other friction elements being supported by said carrier for universal movement with respect thereto whereby the elements carried by said carrier find full surface contact with the elements carried by said bolster, and rubber-like means incorporated in said carrier to absorb short wave vibrations in transmission from said frame through said carrier to said friction elements.

7. In a rail truck, a truck frame, a swing bolster, spring assemblies supporting each end of said bolster from said frame comprising springs having spring caps, said caps each being provided with at least one rocker on its surface exteriorly of the spring which it contacts, spaced snubber assemblies mounted oppositely to the center of said bolster between the ends of said bolster and its center, said snubber assemblies each comprising two friction elements, one of which is mounted on said bolster, a second friction element being mounted on said frame for universal movement with respect thereto and manual means for adjusting the distance between said elements, the rockers of said spring caps being angularly disposed with respect to the direction of swing of said bolster in a direction to cause the friction elements carried by said bolster to increase their pressure with the elements carried by said frame with increasing amplitude of swinging movements of said bolster.

8. In a rail truck, a truck frame, a swing bolster, spring assemblies supporting each end of said bolster from said frame, said spring assemblies each comprising springs having spring caps top and bottom thereon, each of said caps having a pair of rockers radiating outwardly from the center thereof in V-shape, both rockers of each pair being positioned angularly with respect to the direction of swing of said bolster and also to the direction of travel of said truck, the position of the lower rockers of each spring being spaced 180° in vertical aspect from those of the upper rocker whereby said springs will be caused to tilt always in the same direction, thereby urging said bolster out of its normal path of swinging always in the same direction, snubber assemblies comprising friction elements one of which is carried by bolster and another by said frame so positioned as to increase the friction between said elements in response to the out of path swinging movements of said boster, said snubber assemblies being positioned between the ends of said bolster and the center thereof, and means carried by said frame at each side of each end of said bolster through which all accelerating and retarding forces between said bolster and said frame may be transmitted.

9. In a rail truck, a truck frame, a swing bolster, spring assemblies supporting each end of said bolster from said frame, said spring assemblies each comprising springs having spring caps top and bottom thereon, each of said caps having a pair of rockers radiating outwardly from the center thereof in V-shape, both rockers of each pair being positioned angularly with respect to the direction of swing of said bolster and also to the direction of travel of said truck, the position of the lower rockers of each spring being spaced 180° in vertical aspect from those of the upper rocker whereby said springs will be caused to tilt always in the same direction thereby urging said bolster out of its normal path of swinging always in the same direction, the spring caps at one end of the bolster being reversely positioned with respect to those at the other end of the bolster whereby the center line of the bolster tends to swing at a constant angle with respect to the path of swinging movement of the bolster, snubber assemblies comprising friction elements one of which is carried by said bolster and the other of which is carried by said frame, said assemblies being positioned at diagonally opposite sides of said bolster between the ends of the bolster and its center, said assemblies being so positioned that swinging movement of the bolster increases pressure between the friction elements of said assemblies, and means carried by said frame on each side of each end of said bolster through which driving and retarding forces between said frame and said bolster may be transmitted.

10. In a rail truck, a truck frame, a swing bolster, spring assemblies supporting each end of said bolster from said frame, said spring assemblies each comprising springs having spring caps top and bottom thereon, each of said caps having a pair of rockers radiating outwardly from the center thereof in V-shape, both rockers of each pair being positioned angularly with respect to the direction of swing of said bolster and also to the direction of travel of said truck, the position of the lower rockers of each spring being spaced 180° in vertical aspect from those of the upper rocker whereby said springs will be caused to tilt always in the same direction thereby urging said bolster out of its normal path of swinging always in the same direction, snubber assemblies each comprising friction elements, one of which is carried by said frame, the other of which is carried by said bolster, said assemblies being positioned between the ends of said bolster and its center in such manner that the pressure between said elements is increased with swinging movements of said bolster, one element of each of said assemblies being mounted for universal movement and supported by a rubber-like material capable of absorbing short wave vibrations, and additional means through which driving and retarding forces may be transmitted between said frame and said bolster.

11. In a rail truck, a truck frame, a swing bolster, spring assemblies supporting each end of said bolster from said frame, said spring assemblies each comprising springs having spring caps top and bottom thereon, each of said caps having a pair of rockers radiating outwardly from the center thereof in V-shape, both rockers of each pair being positioned angularly with respect to the direction of swing of said bolster and also to the direction of travel of said truck, the position of the lower rockers of each spring being spaced 180° in vertical aspect from those of the upper rocker whereby said springs will be caused to tilt always in the same direction thereby urging said bolster out of its normal path of swinging always in the same direction, snubber assemblies each comprising friction elements, one of which is carried by said bolster, said assemblies being positioned between the ends of said bolster and its center in such manner that the pressure between said elements is increased with swinging movements of said bolster, one element of each of said assemblies being mounted for universal movement and supported by a rubber-like material capable of absorbing short wave vibrations, and additional means through which driving and retarding forces may be transmitted between said frame and said bolster, the bolster supporting springs being initially inclined in a direction to cause contact of the friction elements of said assemblies when said bolster is in centered position.

12. In a snubber assembly, two relatively movable members each carrying a friction element, the friction element carried by one of said members being universally mounted for universal movement with respect thereto, the other of said members being movable in a substantially parallel path with respect to the first named member, and means constantly urging the two members toward each other thereby causing frictional rubbing of said elements, said means increasing the pressure between said elements as the amplitude of the relative movement therebetween increases.

13. In a snubber assembly, two relatively movable members each carrying a friction element, the friction element carried by at least one of said members being backed by a non-metallic pad, means urging said members toward each other when in positions of rest, additional means urging said members toward each other during relative movements thereof, said additional means increasing the pressure between said elements as the amplitude of relative movement between said members increases.

14. In a snubber assembly, a fixed member and a relatively movable member each carrying a friction element, one of said elements being universally mounted to accommodate itself to flat frictional contact with the other of said members, said movable member being supported to incline towards said fixed member whereby said elements are maintained in engagement with each other, and a rocker supporting said movable member, said rocker being angularly disposed with respect to the direction of travel of said movable member and in a direction which requires said movable member to increase the pressure between said elements with increasing amplitude of movement of said movable member with respect to said fixed member.

15. In a snubber assembly, a fixed member and a relatively movable member each carrying a friction element, one of said elements being universally mounted to accommodate itself to flat frictional contact with the other of said members, said movable member being supported to incline towards said fixed member whereby said elements are maintained in engagement with each other, and a pair of half rockers angularly disposed with respect to each other and to the direction of travel of said movable member supporting said movable member, one of said half rockers being disposed in such direction as to tend to tilt said movable toward said fixed member in response to movement of said movable member in one direction, the other of said half rockers being disposed in such direction as to tend to tilt said movable member toward said fixed member in response to movement of said movable member in opposite direction.

References Cited in the file of this patent

UNITED STATES PATENTS

| | | |
|---|---|---|
| 1,896,466 | Schaum | Feb. 7, 1933 |
| 1,941,521 | Wikander | Jan. 2, 1934 |
| 2,190,728 | Mohun et al. | Feb. 20, 1940 |
| 2,312,718 | Konyoumjian | Mar. 2, 1943 |
| 2,492,337 | Travilla | Dec. 27, 1949 |
| 2,519,169 | Beemer et al. | Aug. 15, 1950 |

FOREIGN PATENTS

| | | |
|---|---|---|
| 630,294 | Great Britain | Oct. 10, 1949 |